United States Patent [19]
Splittstoesser et al.

[11] Patent Number: 5,915,487
[45] Date of Patent: Jun. 29, 1999

[54] WALK-BEHIND TRACTION VEHICLE HAVING VARIABLE SPEED FRICTION DRIVE TRANSMISSION

[75] Inventors: Clair D. Splittstoesser; Ronald J. Eisenbart, both of Coffeyville, Kans.

[73] Assignee: Dixon Industries, Inc., Coffeyville, Kans.

[21] Appl. No.: 08/909,181

[22] Filed: Aug. 11, 1997

[51] Int. Cl.⁶ .................................................. B62D 51/04
[52] U.S. Cl. ........................................ 180/19.1; 180/19.3
[58] Field of Search .................................... 180/6.2, 6.24, 180/6.26, 6.32, 6.36, 6.38, 19.1, 19.3, 19.2

[56] References Cited

U.S. PATENT DOCUMENTS

| | | |
|---|---|---|
| D. 311,742 | 10/1990 | Splittstoesser . |
| D. 359,740 | 6/1995 | Crosby et al. . |
| 2,484,264 | 10/1949 | Barnes .................................... 180/6.24 |
| 2,514,917 | 7/1950 | Walstrom .................................. 180/6.2 |
| 3,410,156 | 11/1968 | Davis . |
| 4,129,977 | 12/1978 | Comer . |
| 4,149,358 | 4/1979 | Comer . |
| 4,326,370 | 4/1982 | Thorud . |
| 4,498,552 | 2/1985 | Rouse . |
| 4,558,558 | 12/1985 | Horner, Jr. et al. . |
| 4,625,586 | 12/1986 | Splittstoesser . |
| 4,984,479 | 1/1991 | Phillips . |
| 5,195,307 | 3/1993 | Thorud et al. . |
| 5,228,360 | 7/1993 | Johnson . |
| 5,261,214 | 11/1993 | Wollersheim . |
| 5,355,662 | 10/1994 | Schmidt . |
| 5,364,114 | 11/1994 | Petersen . |
| 5,496,226 | 3/1996 | Splittstoesser et al. . |
| 5,526,635 | 6/1996 | Wilder Jr. . |
| 5,533,325 | 7/1996 | Sallstrom et al. . |
| 5,569,106 | 10/1996 | Splittstoesser et al. . |
| 5,651,241 | 7/1997 | Wegner . |
| 5,848,520 | 12/1998 | Arfstrom et al. ....................... 180/19.3 |

OTHER PUBLICATIONS

Honda Power Equipment Brochure Entitled "Commercial Mowers" (Publication Date Unknown).
Snapper Brochure Entitled "Commercial Products" (Publication Date Unknown).
Snapper Brochure No. A9702, Entitled "Pro Gear Mid–Size Walk Behind" (Publication Date Unknown).
Scag Brochure (Incomplete Copy) (Publication Date Unknown).
Encore Bruchure Entitled "Commercial Turf Equipment" (Publication Date Unknown).
Toro Brochure Entitled "Professional Grounds Maintenance Equipment" pp. 1–3 and 12–15 (Publication Date Unknown).
Giant–Vac Catalog No. 70436, Entitled "Giant Mow" (Publication Date Unknown).
Kees Brochure No. 100319–2, Entitled "Professional Turf Equipment" (Publication Date Unknown).

*Primary Examiner*—Lanna Mai
*Assistant Examiner*—Lynda Jasmin
*Attorney, Agent, or Firm*—Hovey, Williams, Timmons & Collins

[57] ABSTRACT

A self-propelled, walk-behind traction vehicle includes a power source, a pair of drive wheels and an improved operator-manipulated drive control mechanism for selectively coupling the drive wheels to the power source in a manner that allows the operator to control propulsion and steering of the vehicles. The drive control mechanism includes a friction drive unit having a pair of reversible, variable speed transmissions associated with respective ones of the drive wheels for selectively coupling the drive wheels to the power source. The control mechanism further includes a pair of independently swingable control handles configured to be gripped by the operator and operably coupled to respective ones of the transmissions so that the speed and direction of rotation of each of the drive wheels is controlled by swinging a respective one of the handles.

48 Claims, 6 Drawing Sheets

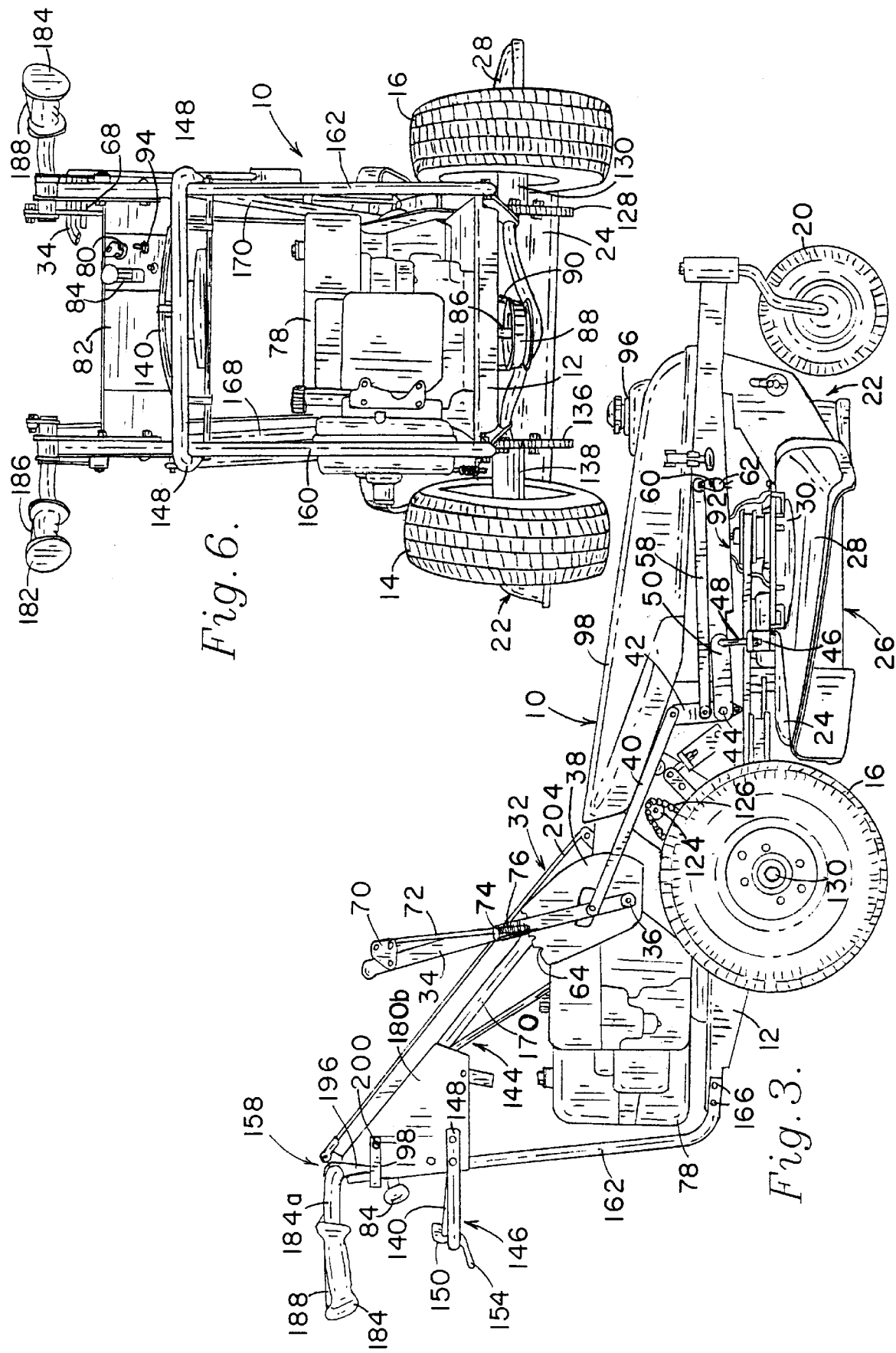

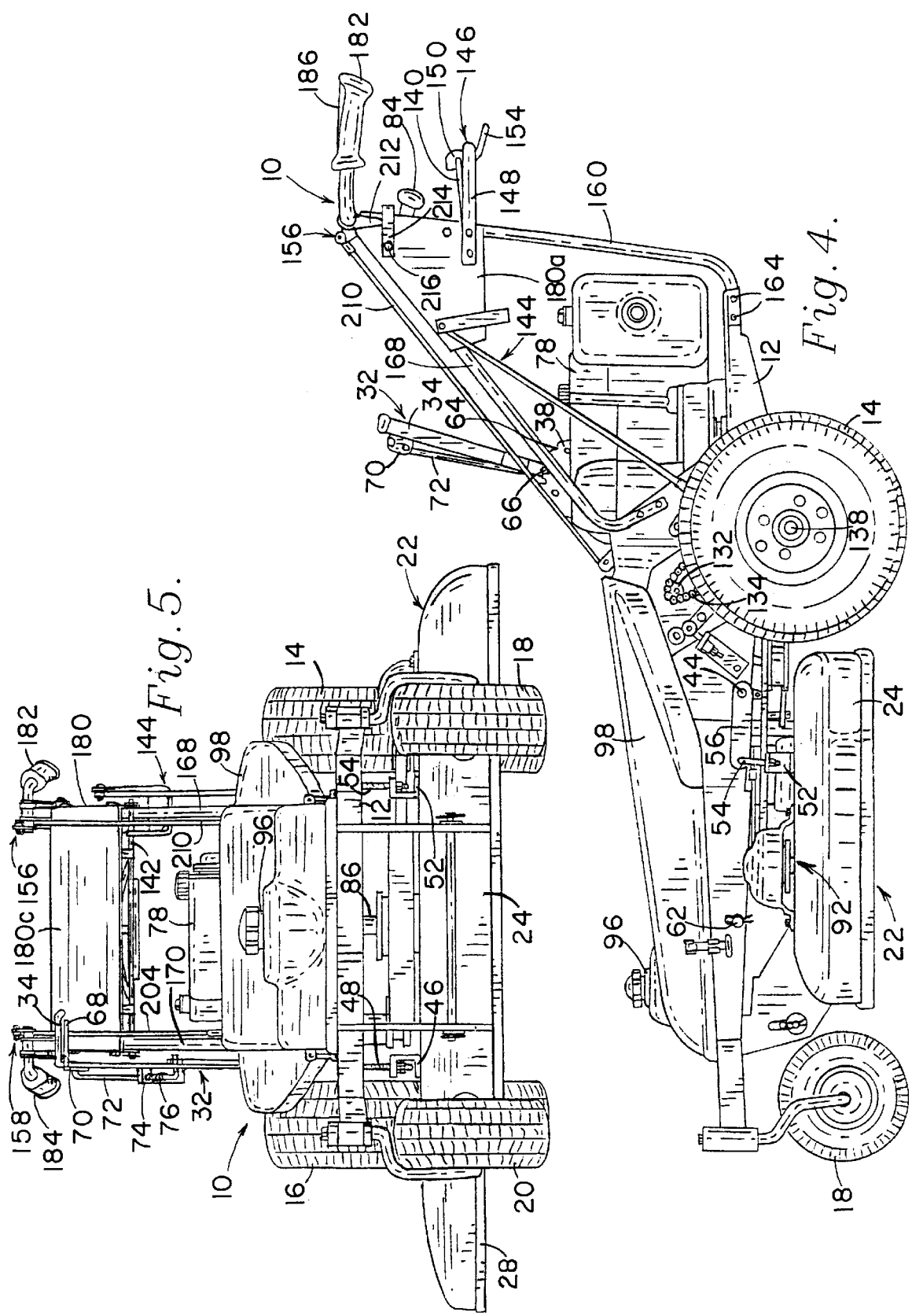

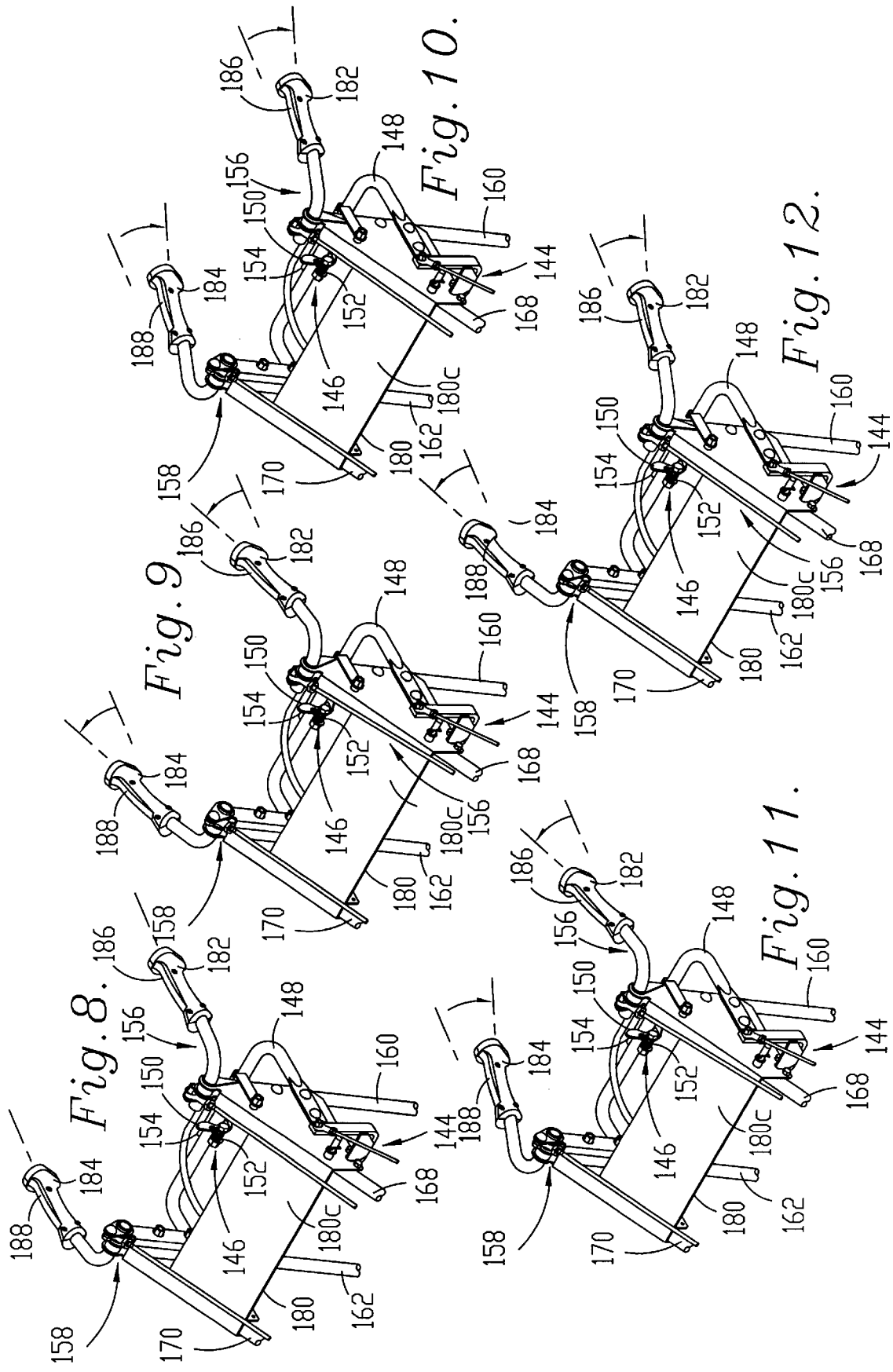

WALK-BEHIND TRACTION VEHICLE HAVING VARIABLE SPEED FRICTION DRIVE TRANSMISSION

BACKGROUND OF THE INVENTION

1. Field of the Invention

The present invention relates generally to self-propelled, walk-behind traction vehicles, such as lawn mowers and various other turf maintenance equipment. More particularly, the present invention concerns an improved operator-manipulated drive control mechanism for controlling traction and steering of the vehicle.

2. Discussion of the Prior Art

Conventional self-propelled, walk-behind traction vehicles, such as lawn mowers, are increasingly including a pair of reversible, variable speed drive wheels so that the operator can control traction and steering of the vehicle. As those ordinarily skilled in the art will appreciate, dirigibility and reversibility is especially important with a large vehicle or with any vehicle used in an area having a large concentration of obstacles that must be avoided as the vehicle is maneuvered within the area. For example, with turf care equipment, it is desirable to have a machine with a relatively wide working width (e.g., cutting width) so as to reduce the time necessary to perform the desired maintenance on a given area of land. However, the increased size of the machine cannot cause it to become unwieldy, otherwise the operator will have difficulty in avoiding the trees, shrubs, fences and other obstacles encountered while moving across the ground.

In the past, the drive control mechanism has typically employed either a gear transmission or a hydrostatic transmission for selectively coupling the drive wheels to the engine. Gear transmissions are traditionally slow to respond to the operator's commands and are cumbersome when reversing directions or changing speeds. Obviously, such characteristics adversely affect the agility of the machine. Additionally, gear transmissions often do not allow the drive wheels to be driven in opposite directions, such that one drive wheel must be stopped while the other drive wheel is rotated to perform the highly desirable zero radius turn. It will be appreciated that the stopped wheel will often create "scuff" marks or otherwise damage the underlying ground. Although hydrostatic transmissions are traditionally more responsive than gear transmissions and more likely to afford independent control of the direction and speed of rotation of the drive wheels, hydrostatic transmissions are typically extremely expensive. Further, operation of a vehicle having a hydrostatic transmission tends to be "jerky" or abrupt; that is, the vehicle tends to lurch as it starts moving from a stopped position, reverses direction, or changes speed.

The maneuverability of the vehicle depends not only on the ability of the drive wheels to rotate in opposite directions and at various speeds, but also on the ability of the vehicle to respond quickly to the operator's commands and to immediately provide the operator with perceptible feedback of his/her commands so that necessary corrections or adjustments may be quickly determined and carried out. Accordingly, the operator-manipulated controls for controlling the transmission must operate in a manner that quickly and accurately converts the operator's commands to movement of the vehicle. The vehicle must also quickly convey to the operator the effect of those commands so that the operator can quickly respond, if necessary. Conventional drive controls are often tedious and difficult to manipulate and, more importantly, fail to place the operator and vehicle "in tune" with one another, such that the responsiveness of the vehicle to the operator's commands and the responsiveness of the operator to the effect of those commands are decreased. Of course, such reduction in responsiveness on the part of the vehicle and of the operator adversely affect the maneuverability of the vehicle.

OBJECTS AND SUMMARY OF THE INVENTION

Responsive to these and other problems, an important object of the present invention is to provide a self-propelled, walk-behind vehicle having a pair of reversible, variable speed drive wheels for allowing the operator to control traction and steering of the vehicle. Another important object of the present invention is to provide such a vehicle with a drive control mechanism including a transmission that responds quickly to the operator's commands yet is relatively inexpensive. Further, an object of the present invention is to provide a transmission that allows the operator to quickly and easily, yet smoothly, adjust the speed and direction of rotation of the drive wheels.

An additional object of the present invention is to provide a drive control mechanism with controls that place the operator and vehicle "in tune" with one another. In this respect, it is an important object of the present invention to provide controls that quickly convert the operator's commands to movement of the vehicle, while immediately providing the operator with feedback of the affect of these commands so that the operator can make necessary adjustments or corrections, if necessary. Particularly, one objective of the present invention is to provide controls that are the primary point of contact between the operator and the vehicle during operation so that the responsiveness of the vehicle and the operator are improved. Yet another object of the present invention is to provide controls that are manipulated in the same direction as that desired for the vehicle (e.g., the controls are pushed generally forwardly when it is desired to move the vehicle in a forward direction). It is also an object of the present invention to provide a separate control for each drive wheel so that the operator may control the direction and speed of rotation of one drive wheel independent of the other.

In accordance with these and other objects evident from the following description of a preferred embodiment of the invention, the traction vehicle includes a drive control mechanism having a pair of independently shiftable control handles configured to be gripped by the operator, wherein each handle is operable to control the traction and speed of a respective one of the drive wheels. The handles preferably extend in a fore-and-aft direction and are swingable about a common, substantially horizontal, laterally extending axis. Further, the drive mechanism is configured in such a manner that the handles swing downwardly and forwardly from a rest position to cause forward rotation of the drive wheels. As will be described hereinbelow, this construction improves the "communication" between the operator and the vehicle so as to improve vehicle maneuverability.

Additionally, the drive control mechanism includes a friction drive unit having a pair of reversible, variable speed transmissions associated with respective ones of the drive wheels for selectively coupling the drive wheels to the power source. Each handle is operably coupled to one of the transmissions so that the speed and direction of rotation of the corresponding drive wheel is controlled by swinging of the handle. With the friction drive unit shown in the drawings, swinging of the handles is proportional to the speed of the drive wheels such that the further the handle is swung from a rest position the faster the corresponding drive wheel rotates. It will be appreciated that the friction drive unit responds quickly to the operator's commands, does not lurch when changing direction or speed, and is less expensive than a hydrostatic transmission.

If desired, each handle may be provided with a safety switch which is depressed when the operator grips the handle so as to signify his/her presence. Preferably, the safety switches are operable to kill the engine when the operator releases both handles.

Other aspects and advantages of the present invention will be apparent from the following detailed description of the preferred embodiment and the accompanying drawing figures.

BRIEF DESCRIPTION OF THE DRAWING FIGURES

A preferred embodiment of the invention is described in detail below with reference to the attached drawing figures, wherein:

FIG. 3 is a right side elevational view of the mower;

FIG. 4 is a left side elevational view of the mower;

FIG. 5 is a front elevational view of the mower;

FIG. 6 is a rear elevational view of the mower;

FIG. 8 is a fragmentary perspective view of the upper portion of the mower, particularly illustrating the control handles in a rest position, whereby the drive wheels are drivingly disconnected from the engine;

FIG. 9 is a fragmentary perspective view of the upper portion of the mower similar to FIG. 8, but illustrating both control handles shifted upwardly from the rest position to cause rearward rotation of the drive wheels such that the mower is driven rearwardly;

FIG. 10 is a fragmentary perspective view of the upper portion of the mower similar to FIG. 8, but illustrating both control handles shifted downwardly and forwardly from the rest position to cause forward rotation of the drive wheels such that the mower is driven forwardly;

FIG. 11 is a fragmentary perspective view of the upper portion of the mower similar to FIG. 8, but illustrating the right control handle shifted downwardly and forwardly from its rest position and the left control handle shifted in an upward direction from its rest position to sharply turn the mower to the left;

Figure 7:
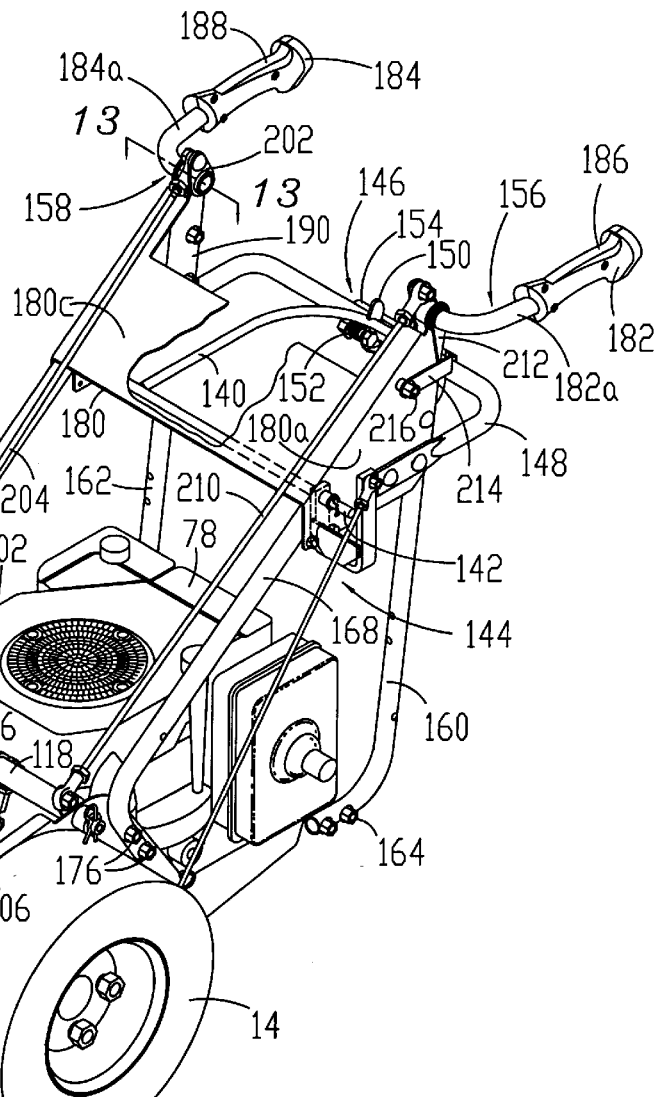
FIG. 7 is a perspective view of the rear portion of the mower, with parts being removed to show the details of construction of the drive control mechanism.
Figure 13:
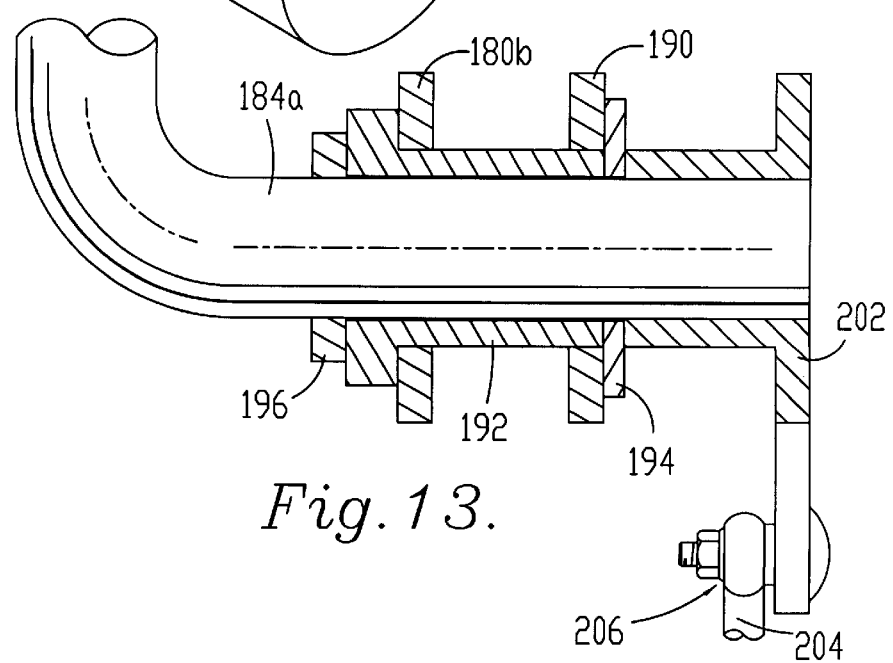

FIG. 12 is a fragmentary perspective view of the upper portion of the mower similar to FIG. 11, but illustrating the control handles shifted in respective opposite directions to sharply turn the mower to the right; and FIG. 13 is an enlarged, fragmentary, horizontal cross-sectional view taken along line 13—13 in FIG. 7, particularly illustrating the structure for swingably mounting the right control handle.

DETAILED DESCRIPTION OF THE PREFERRED EMBODIMENT

Turning now to the drawings, the traction vehicle selected for illustration comprises a self-propelled, walk-behind mower 10 having a chassis 12 supported by rear drive wheels 14,16 and front caster wheels 18,20. The front wheels 18,20 of the illustrated mower 10 are not driven nor do they serve to steer the mower 10 as such is accomplished by controlling the direction and speed of rotation of the rear wheels 14,16, as will subsequently be described. Accordingly, the front wheels 18,20 serve simply to support the chassis 12 above the ground and may be replaced with a single caster wheel (not shown) positioned at the transverse center of gravity of the mower, if desired.

A mowing assembly 22 is suspended from the chassis 12 for severing grass as the mower is driven across the ground. In the illustrated embodiment, the mowing assembly 22 includes a downwardly open deck 24 adjustably mounted beneath the chassis 12 between the rear wheels 14,16 and the front wheels 18,20. A pair of cutting blades (not shown) are mounted within the deck 24 for rotational movement about laterally spaced, upright axes. The deck 24 includes a side discharge opening 26 (see FIG. 3) through which the grass clippings are propelled by the cutting blades, with a shield 28 being mounted to the deck 24 by a bracket 30 in the usual manner for deflecting the material exiting through the discharge opening 26 downwardly toward the ground. The cutting height of the mower 10 is determined by the position of the deck 24 relative to the chassis 12.

Figure 1:
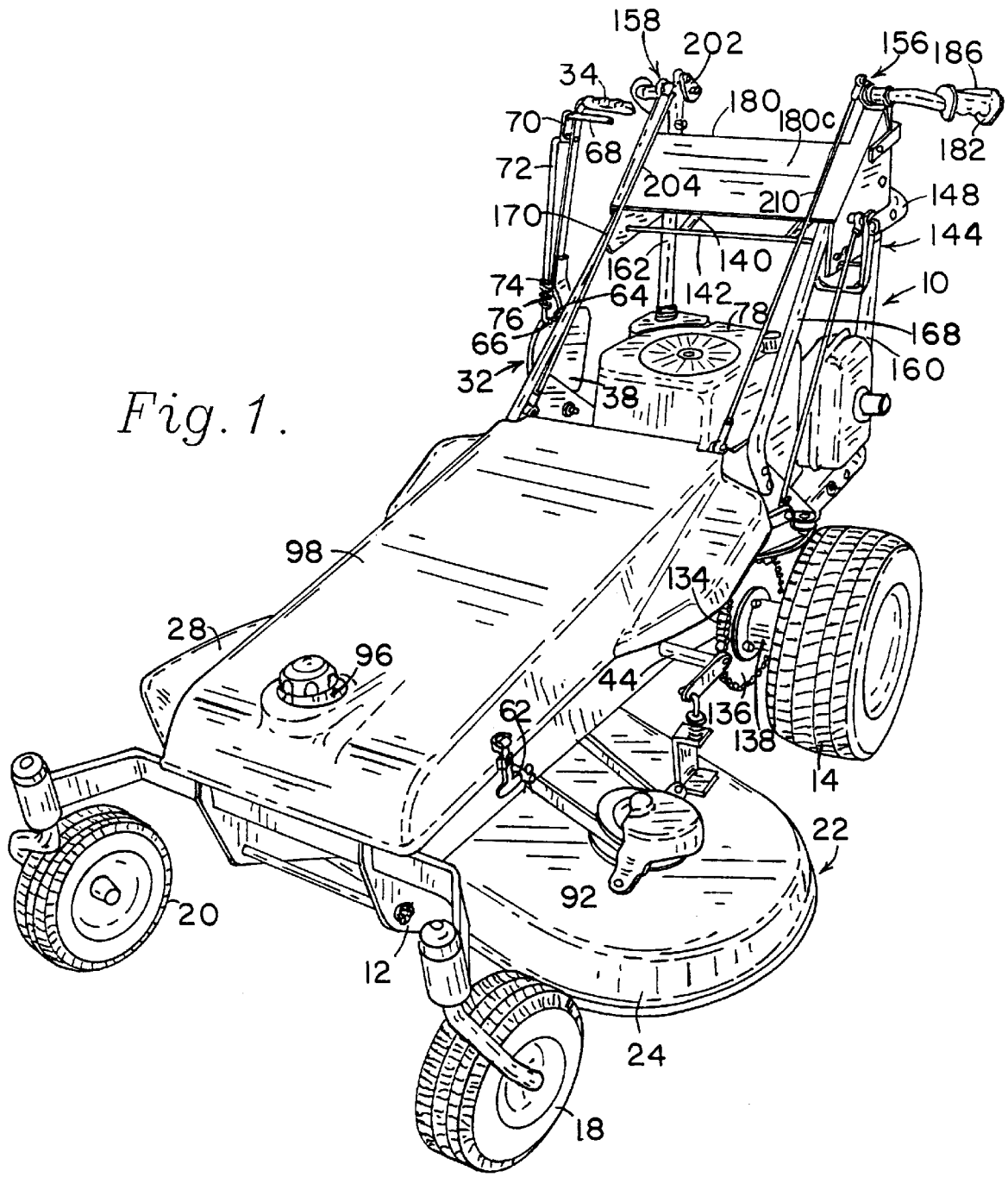
FIG. 1 is a perspective view of a self-propelled walk-behind mower provided with an improved drive control mechanism constructed in accordance with the principles of the present invention.
Figure 2:
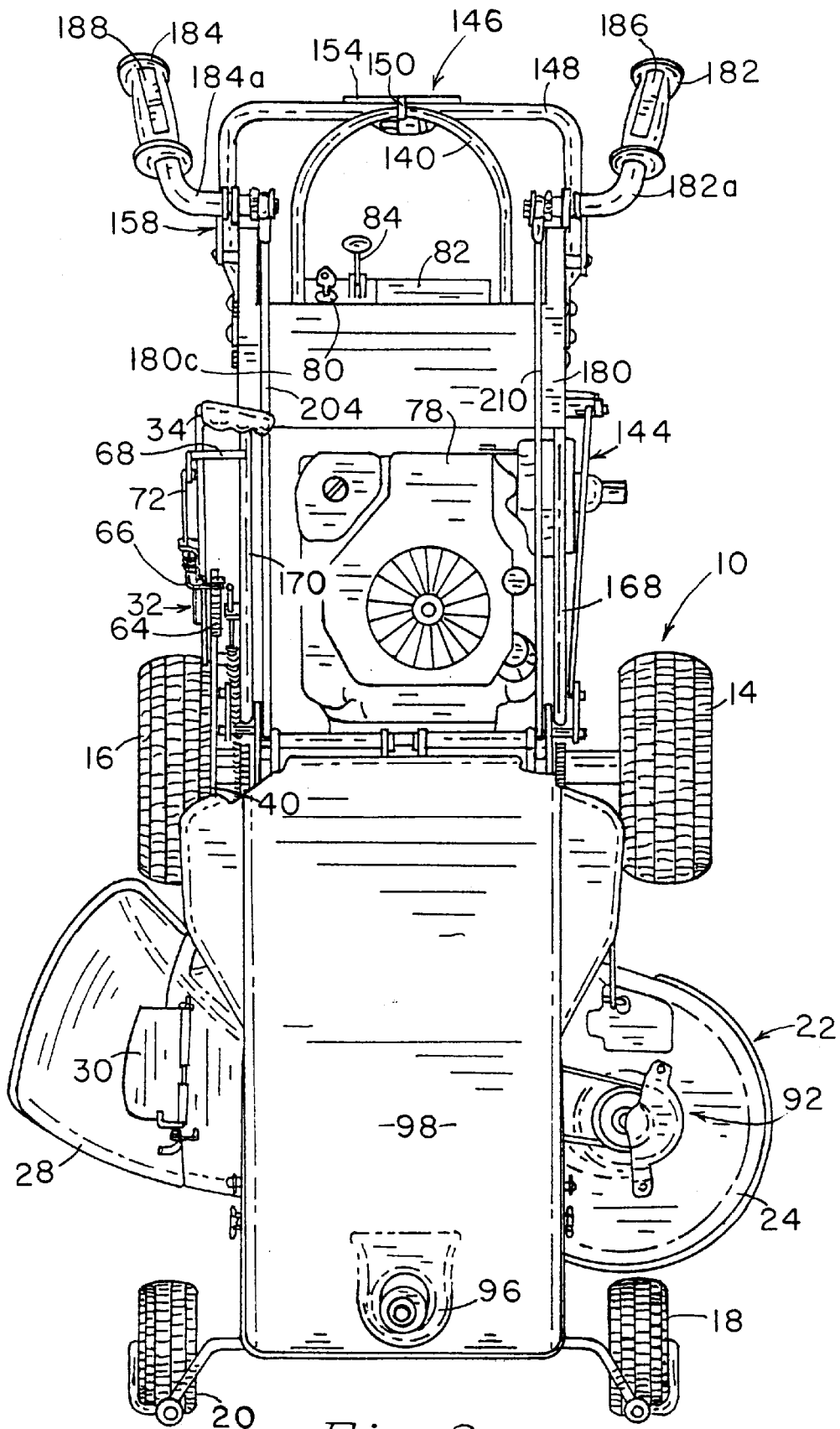
FIG. 2 is a top plan view of the mower.

In this respect, a single point lift device 32 is provided on the mower 10 for allowing the operator to simply and quickly adjust the position of the deck 24 relative to the chassis 12, and thereby the cutting height, from the operating position located behind the mower 10. As shown in FIG. 3, the lift device 32 includes an upwardly projecting control arm 34 swingably mounted at pivot 36 to a support plate 38 fixed to the right side of the chassis 12. A link 40 pivotally connected to the arm 34 above the pivot 36 extends forwardly to a crank 42 mounted on a transversely extending shaft 34. Although not illustrated in detail, it will be appreciated that the shaft 34 is rotatably supported on the chassis 12. Accordingly, swinging of the control arm 34 causes the crank 42 to swing in the same direction and the shaft 44 to rotate with the crank 42. A U-shaped bracket 46 welded to the top surface of the deck 24 and a nut-and-bolt assembly 48 projecting upwardly from the bracket 46 serve to attach the deck 24 to a lug 50 projecting rigidly and forwardly from the shaft 44. Accordingly, the right, rear portion of the deck 24 is adjustably supported on the chassis 12 by the rotatable shaft 44. As shown in FIGS. 1 and 4, similar structure, including a U-shaped bracket 52, a nut-and-bolt assembly 54, and a lug 56, is provided on the left side of the mower 10 for interconnecting the deck 24 and the shaft 44 so that the left, rear portion of the deck is likewise adjustably supported on the chassis 12. A second link 58 pivotally connected to the crank 42 between the first link 40 and shaft 44 extends forwardly therefrom to a crank 60 fixed to a rotatable, transversely extending shaft 62. Thus, as the control arm 34 is moved back and forth, the cranks 42 and 60 swing in the same directions and the shafts 44 and 62 rotate in the same directions. Similar to the rear attachment structure, a lug (not shown) fixed to the shaft 62 between the ends thereof, a U-shaped bracket (not shown) welded to the top surface of the deck 24, and a nut-and-bolt assembly (not shown) extending between the lug and bracket cooperate to attach the front portion of the deck 24 to the rotatable shaft 62. It will be appreciated that the nut-and-bolt assemblies 48,54 allow the operator to level the deck as desired in both the fore-and-aft and side-to-side directions.

It will be further noted that the control arm 34 and support plate 38 include structure cooperating to selectively prevent swinging movement of the control arm 34 for releasably locking the deck 24 in its various adjusted positions. As perhaps best shown in FIG. 3, the support plate 38 includes a plurality of spaced notches 64 defined along an upwardly facing edge thereof As will subsequently be described, these notches 64 serve to define the various adjusted positions of the mower deck 24. A locking pin 66 (see FIG. 4) is shiftably carried on the control arm 34 for movement between a locked position, in which the pin 66 is received within one of the notches 64 to prevent swinging of the control arm 34, and an unlocked position, in which the pin is removed from the notch so that the control arm 34 is freely swingable. Movement of the pin 66 is controlled by a hand lever 68 (see FIG. 1) supported on the control arm 34 by a bell crank 70. An L-shaped link 72 has a relatively short leg connected to the crank 70 and the other leg extending downwardly therefrom through an aperture in guide bracket 74 to support the pin 66 at the lowermost end thereof In the preferred embodiment, the pin 66 and link 72 are formed of a single U-shaped rod. A compression spring 76 retained between the bracket 74 and pin 66 yieldably biases the pin 66 downwardly so that the pin 66 automatically shifts into its locked position when the hand lever 68 is released and the pin 66 is aligned with one of the notches 64.

With the deck 24 adjustably supported on the chassis 12 in this manner, the cutting height is adjusted simply by pulling on the hand lever 68 to remove the locking pin 66 from one of the notches 64. With the hand lever 68 pulled, the control arm 34 is unlocked and may therefore swing freely in both a forward and rearward direction. To lower the cutting height, the control arm 34 is swung forwardly so that the shafts 44 and 62 rotate in a clockwise direction when viewing FIG. 3, such that the deck 24 is moved away from the chassis 12. Conversely, when it is desired to raise the cutting height, the control arm 34 is pulled rearwardly so that the shafts 44 and 62 rotate in a counterclockwise direction (also viewing FIG. 3) to thereby move the deck 24 toward the chassis 12. Once the deck 24 has been moved to a desired position, the hand lever 68 is released, such that the compression spring 76 urges the locking pin 66 into the notch 64 corresponding to the desired cutting height to lock the deck 24 in the desired position.

Power for the cutting blades (not shown) is provided by an internal combustion engine 78 supported on the chassis 12 generally behind the rear wheels 14,16, although other suitable power sources may be utilized. In the illustrated embodiment, the engine 78 is provided with an electric starter (not shown), and accordingly, a key-operated ignition switch 80 is provided on a control panel 82 of the mower 10 (see FIG. 6) for starting and stopping the engine 78. A choke and throttle control 84 is also provided on the panel 82 for allowing the operator to control the RPM of the engine 78. A drive shaft 86 (see FIG. 6) extends downwardly from the engine 78 and supports a sheave 88 entrained by a forwardly extending belt 90. In the usual manner, the belt 90 is connected to the belt-and-pulley assembly 92 of the mower deck 24 for transferring driving power to the cutting blades. Although not illustrated, it will be appreciated that the mower 10 includes an electric blade clutch (not shown) provided on the drive shaft 86 between the engine 78 and sheave 88 to allow selective driving of the cutting blades. A switch 94 is provided on the panel 82 for engaging and disengaging the blade clutch (not shown). It will be appreciated that the ignition switch 80 and the blade clutch switch 94 are wired in such a manner that the mower engine 78 cannot be started unless the blade clutch is disengaged so that the cutting blades are drivingly disconnected from the engine 78. As a matter of interest, the gas tank 96 for the engine 78 is positioned at the front of the chassis 12 and is substantially covered by a removable shroud 98.

As perhaps best shown in FIG. 7, the mower 10 includes a drive control mechanism 100 for selectively connecting the rear wheels 14 and 16 to the engine 78 in such a manner that allows the operator to control traction and steering of the mower 10. In the illustrated embodiment, the control mechanism 100 includes a friction drive unit 102 for allowing independent control of the speed and direction of rotation of each drive wheel 14 and 16. The illustrated friction drive unit 102 is very similar in construction to the unit shown in U.S. Pat. No. 5,496,266, entitled FRICTION DRIVE UNIT FOR RIDING LAWN MOWERS AND THE LIKE, which is hereby incorporated by reference to the extent necessary for a full and complete understanding of the present invention. It should therefore be sufficient to explain that the drive unit 102 includes a stationary frame 104 secured to the chassis 12 and supporting a pair of reversible, variable speed transmissions 106 and 108, each associated with a respective drive wheel 14 and 16. Generally speaking, the transmissions 106 and 108 include shiftable driven drums 110 and 112, respectively, and share a common power input element including a pair of vertically spaced drive cones 1 14 (only the top drive cone being shown in FIG. 7). The drive cones 114 are mounted to a rotatable, upright shaft 116 which is selectively connected to the engine 78 for providing power to the drive unit 102. In the usual manner, the direction of rotation of each drive wheel depends upon which drive cone is contacted by the shiftable drum of the corresponding transmission, and the speed of rotation of the wheel is determined by the location of contact between the cone and drum. The drive unit 102 is provided with means for biasing both drums 110 and 112 into a neutral position, in which the drums 110 and 112 are removed from the drive cones 114 so that the wheels 114 and 116 are drivingly disconnected from the engine 78. The drive unit 102 further includes a pair of operator-manipulated input shafts 118 and 120 that serve to control shifting of the drums 110 and 112, respectively.

As shown in FIG. 7, driving power from the output shaft (not shown) of the right transmission 108 is supplied through a brake assembly 122 to a relatively small drive sprocket 124. An endless chain 126 (see FIG. 3) entrains the drive sprocket 124 and extends generally downwardly and rearwardly to entrain the relatively large driven sprocket 128 (see FIG. 6) fixed to the right drive wheel axle 130. The left drive wheel 14 is similarly connected to the output shaft (not shown) of the left transmission 106 by a brake assembly (not shown), a small drive sprocket 132 (see FIG. 4), an endless chain 134, and a large driven sprocket 136 (see FIG. 6) fixed to the left drive wheel axle 138. Although the brake assemblies 122 are provided for restricting rotation of the drive wheels 14,16, they are not intended to do so while driving power is supplied to the wheels by the drive unit 102; that is, the brake assemblies 122 are intended to function only as a parking brake. As will subsequently be described, stopping or slowing of the mower 10 during operation is normally achieved by reversing the direction of the transmissions 106,108. In this respect, a U-shaped, hand-operated parking brake bail 140 is provided adjacent the control panel 82 for selectively setting the brake assemblies 122. The bail 140 is swingably mounted to the mower 10 by a transverse shaft 142 for movement between a generally horizontal, disengaged position (see FIGS. 6 and 7) and an upright engaged position (not shown). Suitable structure such as a torsion spring (not shown) is provided for biasing the bail 140 into the engaged position. As those ordinarily skilled in the art will appreciate, the bail 140 is operably connected to the brake assemblies 122 by linkage, generally referenced by the numeral 144, for setting the brake assemblies 122 when in the engaged position and for releasing the brake assemblies 122 when in the disengaged position. Further, the bail 140 is operably connected to a belt tensioning assembly (not shown) disposed below the chassis 12 and configured for tensioning the drive belt (not shown) connected between the drive shaft 86 of the engine 78 and the input shaft 116 of the friction drive unit 102 when the bail 140 is in its disengaged position. Accordingly, when the parking brake assemblies 122 are set, with the bail 140 in its engaged position, the drive belt (not shown) for supplying power to the drive unit 102 is sufficiently slackened to prevent the unit 102 from driving the wheels 14,16. It will further be appreciated that the bail 140 and ignition switch 80 are operably interconnected to prevent the operator from starting the engine 78 unless the bail 140 is in its upright, engaged position (i.e., unless the parking brake is set).

Thus, once the engine 78 has been started and it is desired to drive the mower 10, the bail 140 is swung downwardly toward its disengaged position to release the parking brake assemblies 122 and to tension the drive belt extending between the drive shaft 186 of the engine 78 and the input shaft 116 of the friction drive unit 102. An automatic catch assembly 146 is secured to a stationary tow handle 148 for releasibly retaining the bail 140 in its disengaged position. As perhaps best shown in FIG. 7, the catch assembly 146 includes a hook 150 and a torsion spring 152 for yieldably biasing the hook into catching engagement with the bail 140 when the same is moved into its disengaged position. Accordingly, the operator need not hold the bail 140 down in its disengaged position during mowing operations. The bail 140 is released from its disengaged position simply by depressing a plate 154 fixed to the hook 150 for swinging movement therewith.

The drive control mechanism 100 further includes a pair of left and right operator controls 156 and 158 provided adjacent the rear of the chassis 12 for allowing an operator in trailing relationship with the mower 10 to control operation of the friction drive unit 102, and thereby control traction and steering of the mower 10. As will subsequently be described, the drive controls 156,158 are constructed in a manner to place the mower 10 and the operator "in tune" with one another so as to improve the maneuverability of the mower 10. Further, the drive controls 156 and 158 allow the operator to independently control the direction and speed of rotation of the drive wheels 14 and 16, which also enhances the maneuverability of the mower 10.

It will be noted that the drive controls 156,158 are supported on the chassis 12 by suitable handlebar support structure. In the illustrated embodiment, such structure includes a pair of laterally spaced, upwardly extending, L-shaped handlebars 160 and 162 fastened to the rear of the chassis 12 by nut-and-bolt assemblies 164 (see FIGS. 4 and 7) and 166 (see FIG. 3), respectively. The support structure further includes a second pair of laterally spaced handlebars 168 and 170 that extend upwardly and rearwardly from the chassis 12 toward the upper ends of respective handlebars 160 and 162. The angled handlebars 168 and 170 are fastened, by nut-and-bolt assemblies 176 (only the assemblies for the left handlebar 168 being shown), to upright support plates 172 and 174 fixed to opposite sides of the chassis 12. A substantially U-shaped element 180, including a pair of triangular shaped side panels 180a, 180b and a front panel 180c extending therebetween, serves to secure the upper ends of the handlebars 160,162,168,170 to one another. It will be noted that the brake bail 140 and the stationary tow handle 148 are supported on the element 180, as perhaps best shown in FIG. 7.

The drive controls 156 and 158 include rearwardly extending, swingable handles 182 and 184, respectively, which are configured to be gripped by the operator during mowing operations. As will subsequently be described, swinging of each of the handles 182 and 184 serves to control the direction and speed of rotation of the respective drives wheel 14 and 16. Further, each handle 182 and 184 is provided with an operator presence safety switch 186 and 188 which is depressed by the operator when the handle is gripped. That is, the switches 186 and 188 are configured to be naturally depressed by the operator to signify his/her presence when the handles 182 and 184 are gripped. The switches 186 and 188 are preferably interconnected with the blade clutch switch 94 in such a manner that prevents the clutch from being engaged (i.e., prevents the blades from being drivingly connected to the engine 78) unless one of the safety switches 186 or 188 is depressed (i.e., unless one of the handles 182 or 184 is gripped by the operator). Additionally, the switches 186,188 are connected to the engine 78 to kill the latter when both handles 182,184 are released while the blade clutch is engaged. Accordingly, releasing only one handle while the blade clutch is engaged will not kill the engine 78, nor will releasing both handles if the blade clutch has been disengaged.

Turning specifically to the construction of the right drive control 160, the handle 184 includes an inwardly curved shank portion 184a projecting through the right side panel 180b and through a support bracket 190 bolted to the upper end of handlebar 162 (see FIGS. 7 and 13). A bearing sleeve 192 disposed between the shank portion 184a and both the stationary side panel 180b and the stationary support bracket 190 allows the shank portion to rotate relative to the panel and bracket. As shown in FIG. 13, the bearing sleeve 192 is retained between a washer 194 fixed to the shank portion 184a and a triangular-shaped element 196 fixed to the shank portion 184a at a location spaced outwardly from the washer 194. The element 196 and an L-shaped plate 198 fastened to the right side panel 180b by a nut-and-bolt assembly 200 cooperatively limit swinging movement of the handle 184. Particularly, the nut-and-bolt assembly 200 and the inwardly projecting leg (not shown) of the plate 198 serve as stops which limit movement of the element 196 therebetween as it swings with the handle 184. A crank 202 fixed to the innermost end of the shank portion 184a is pivotally connected to an adjustable link 204 by assembly 206 for converting rotational movement of the shank portion 184a to generally axial shifting of the link 204. The link 204 extends forwardly and downwardly from the crank 202 in a generally parallel relationship with the handlebar 170 and is pivotally connected in a similar manner to a crank 208 fixed to the input shaft 120 of the right transmission 108.

Accordingly, the link 204 serves to transfer rotational movement of the shank portion 184a to the input shaft 120, such that rotation of the input shaft 120 corresponds with swinging of the handle 184. In this respect, the right transmission 108 serves to maintain the right handle 184 in a rest position corresponding with the neutral position of the drum 112, although the drum may be shifted in opposite directions out of its neutral position by swinging the handle in opposite directions from its rest position. It will be appreciated that the length of the link 204 is adjustable so that the orientation of the handle 184 in its rest position may be adjusted by the operator, although it is preferred that the handle be disposed in a substantially horizontal plane when in its rest position.

Again, the element 196 and L-shaped plate 198 cooperatively limit swinging of the handle 184 and therefore shifting of the drum 112.

In the usual manner, rotation of the input shaft 120 in one direction causes the drum 112 to shift from its neutral position and engage one of the drive cones to drivingly connect the right wheel 16 to the engine 78. On the other hand, when the input shaft 120 is rotated in an opposite direction, the drum 112 engages the other drive cone to rotate the right wheel 16 in an opposite direction. In the illustrated embodiment, the handle 184 and right transmission 108 are interconnected in such a manner that downward and forward swinging of the handle 184 from its rest position causes forward rotation of the right drive wheel 16, while swinging of the handle 184 in an opposite direction from its rest position causes rearward rotation of the wheel 16. As previously indicated, the degree of rotation of the input shaft 120 (i.e., the amount of shifting of the drum 112 out of its neutral position) is proportional to the speed of the right drive wheel 16. Particularly, the further the input shaft 120 is rotated in one direction, the faster the drive wheel 16 rotates. Accordingly, the operator is able to control the rotational speed of the right drive wheel 16 simply by adjusting the position of the handle 184. That is, the further the handle 184 is shifted from its rest position the faster the drive wheel 16 is rotated. Of course, if the drive wheel 16 is rotating too fast, the rotational speed may be reduced simply by moving the handle 184 toward its rest position.

The left drive control 156 is nearly identical in construction to the right drive control 158. Thus, it should be sufficient to explain that the handle 182 is operably connected to the input shaft 118 of the left transmission 106 by an adjustable link 210. Further, the left drive control 156 includes a device for limiting swinging of the handle 184, wherein such device comprises a triangular shaped element 212 fixed to the shank portion 182a of the handle 182 and an L-shaped plate 214 fastened to the left side panel 180a by a nut-and-bolt assembly 216. The left drive control 156 also operates in a manner similar to the right drive control 158, and accordingly, downward and forward swinging of the handle 182 causes the left drive wheel 14 to rotate in a forward direction, while swinging of the handle 182 in a generally upward direction causes rearward rotation of the wheel 14. Additionally, the amount the handle 182 is swung from its rest position is proportional to the rotational speed of the left drive wheel 14.

It will be noted that the handles 182,184 are swingable about a common, laterally extending axis defined by the rotational axes of the shank portions 182a, 184a. With such alignment along the fore-and-aft axis of the mower 10, the handles 182,184 tend to be more comfortable and easier to manipulate. Preferably, the handles 182 and 184 are not connected to one another in any manner and consequently may be independently swung by the operator. Accordingly, the drive wheels 14 and 16 are independently reversible and may be rotated at different speeds; that is, the direction and speed of one of the drive wheels is not dependent upon the other. It will be appreciated that the word "independently" as used herein shall not be interpreted to mean at different times. For example, the handles are independently swingable in the sense that swinging of one handle is separate from swinging of the other, although the handles may be simultaneously swung by the operator in the same direction and to the same degree.

OPERATION

To start the engine 78, the parking brake assembly 122 must be set and consequently the brake bail 140 must be in its upright, engaged position, and the blade clutch switch 94 must be in its disengaged position so that the cutting blades are drivingly disconnected from the engine 78. Once these conditions have been met, the operator actuates the electric starter of the engine 78 by turning the key-operated ignition switch 80. If necessary, the choke and throttle control 84 may be adjusted by the operator.

With the engine 78 running, the mower 10 may be driven to a desired location or the blade clutch may simply be engaged to begin mowing operations. It will be appreciated that the mower 10 may also be manually moved to a desired location by pushing or pulling the tow handle 148. Assuming the operator desires to begin mowing operations, the brake bail 140 is swung downwardly to its disengaged position and locked therein by the catch assembly 146. While gripping one of the handles 182 or 184 to depress the corresponding safety switch 186 or 188, the operator shifts the blade clutch switch 94 to engage the blade clutch so that the cutting blades housed within the mower deck 24 are drivingly connected to the engine 78. If at any time thereafter the operator removes both hands from the handles 182 and 184 so that safety switches 186 and 188 are no longer depressed, without disengaging the blade clutch, the engine 78 will be automatically stopped. Thus, the safety switches 186 and 188 operate as a kill switch for the engine 78. Because the brake bail 140 is in its disengaged position, the upright input shaft 116 of the friction drive unit 102 is drivingly connected to the engine 78 such that the drive cones 114 are rotating. However, with the drums 110 and 112 being yieldably maintained in their respective neutral positions disengaged from the drive cones 114, driving power is not supplied to the rear wheels 14 and 16.

Once the blade clutch is engaged and the necessary throttle adjustments have been made, the mower 10 is ready to be propelled across the ground. The operator simply grips both handles 182 and 184 and swings them from their rest positions (shown in FIG. 8) to achieve the desired direction and speed of the mower 10. For example, if the operator wishes to move the mower 10 in a rearward direction, both handles 182 and 184 are swung upwardly from their rest positions, as shown in FIG. 9. On the other hand, when it is desired to drive the mower 10 forwardly, both handles 182 and 184 are pushed downwardly and forwardly from their rest positions in the manner shown in FIG. 10. It will be appreciated that the position of the handles shown in FIG. 9 also corresponds with braking of the mower 10 as it moves in a forward direction, and the converse may be said about FIG. 10. That is, as the mower 10 moves in one direction, it is possible to slow or stop the mower by swinging the handles 182 and 184 so that the rear wheels 14 and 16 are driven in an opposite direction. As indicated above, the speed of the mower 10 in the forward or rearward directions is simply adjusted by varying the amounts the handles 182 and 184 are swung from their rest positions. To facilitate movement of the mower 10 along a straight path (i.e., to simplify driving the wheels 14 and 16 at the same speed), the handles 182 and 184 are disposed within the same, generally horizontal plane when in their rest positions, and the drums 110 and 112 of the friction drive unit 102 are designed to shift equal amounts from their neutral positions when the handles 182 and 184 are swung equally in the same direction.

The vehicle may be turned either gradually or sharply in either direction. When the operator desires to turn the vehicle gradually as it moves in a forward or rearward direction, one of the handles is swung further from its rest position than the other handle. The drive wheel corresponding to the one handle rotates faster than the other drive wheel, and consequently, the mower 10 turns about the relatively slower rotating wheel. On the other hand, when it is desired to sharply turn the vehicle (i.e., to perform a zero radius turn), the handles 182 and 184 are moved in opposite directions so that the drive wheels 14 and 16 rotate in opposite directions. A zero radius turn about the left drive wheel 14 is performed by moving the left handle 182 upwardly and the right handle 184 downwardly and forwardly, as shown in FIG. 11, while a zero radius turn about the right drive wheel 16 is accomplished by swinging the handles in the opposite directions, as shown in FIG. 12.

The drive control mechanism 100 of the illustrated mower 10 provides several advantages heretofore unavailable on self-propelled, walk-behind traction vehicles. For example, the friction drive unit 102 provides a quick response to the operator's commands, without lurching when the direction or speed of rotation of either drive wheel 14 or 16 is changed. Further, the friction drive unit 102 is relatively less expensive than a hydrostatic transmission. The handles 182 and 184 are also unique in the sense that the structure providing the point of contact between the mower 10 and the operator also serves to control traction and steering of the mower. This arrangement is especially useful when the handles 182 and 184 are constructed in the manner described hereinabove. For example, as the mower 10 is moving forwardly and the operator desires to increase its speed, then the operator will naturally walk faster than the mower 10 such that he/she begins to "push" the mower. Because the point of contact between the mower 10 and the operator is the handles 182 and 184, this "pushing" force exerted by the operator causes the handles to swing downwardly and forwardly such that the mower speed is increased. On the other hand, if the mower is moving to quickly, the operator will naturally walk slower than the mower such that the downward and forward pressure exerted on the handles decreases. The handles consequently swing toward their rest position and the mower speed is reduced. Accordingly, the drive control mechanism quickly responds to the commands of the operator. Further, with the operator gripping the control handles 182 and 184, the effects of his/her commands are quickly perceived so that necessary adjustments or corrections can be made. This perceptible feedback is enhanced by the fact that the directions the handles 182 and 184 are swung correspond generally to the directions of the mower. The responsiveness of both the mower and operator is also improved because of the independent controls provided for the drive wheels 14 and 16.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, the principles of the present invention are equally applicable to various other self-propelled turf maintenance equipment, such as aerators, vacuums, etc.

The inventors hereby state their intent to rely on the Doctrine of Equivalents to determine and assess the reasonably fair scope of their invention as pertains to any apparatus not materially departing from but outside the literal scope of the invention as set out in the following claims.

What is claimed is:

1. In a self-propelled, walk-behind traction vehicle including a power source and a pair of drive wheels, an improved operator-manipulated drive control mechanism for selectively coupling the drive wheels to the power source in a manner that allows the operator to control propulsion and steering of the vehicle, said drive control mechanism comprising:

a pair of independently shale control handles configured to be gripped by the operator, each of said handles being operable to control the traction and speed of a respective one of the drive wheels, each of said handles being shiftable in opposite directions from a rest position, with shifting in one of said directions causing forward rotation of the respective wheel and shifting in the other of said directions causing rearward rotation of the respective wheel.

2. In a traction vehicle as claimed in claim 1, said one of said directions and said other of said directions being the same for both handles such that the handles are shiftable in a first common direction for moving the vehicle forwardly and an opposite, second common direction for moving the vehicle rearwardly.

3. In a traction vehicle as claimed in claim 2, said handles extending in a generally fore-and-aft direction and being swingable about a common, substantially horizontal, laterally extending axis.

4. In a traction vehicle as claimed in claim 3, said first common direction being generally downward and forward.

5. In a traction vehicle as claimed in claim 4, each of said handles including a safety switch which is configured to be depressed for signifying the presence of an operator when the handle is gripped by the operator.

6. In a traction vehicle as claimed in claim 5, said safety switch of each of the handles being operable to kill the power source when both handles are released.

7. In a traction vehicle as claimed in claim 4, and a friction drive unit having a pair of reversible, variable speed transmissions associated with respective ones of the drive wheels for selectively coupling the drive wheels to the power source, said handles being operably coupled to respective ones of the transmissions so that the speed and direction of rotation of each of the drive wheels is controlled by swinging of a respective one of the handles.

8. In a traction vehicle as claimed in claim 7, said handles being coupled to the respective transmissions in such a manner that the speed of each of the drive wheels, in either direction, increases as the handle is swung further from the rest position.

9. In a traction vehicle as claimed in claim 8; and a pair of devices for limiting swinging of respective ones of the handles in said opposite directions.

10. In a traction vehicle as claimed in claim 9, each of said devices comprising a pair of spaced apart stationary stops and a rigid element fixed to the respective one of the handles for swinging movement therewith between the stops.

11. In a traction vehicle as claimed in claim 1, said handles extending in a generally fore-and-aft direction and being swingable about a common, substantially horizontal, laterally extending axis.

12. In a self-propelled, walk-behind traction vehicle including a power source and a pair of drive wheels, an improved operator-manipulated drive control mechanism for selectively coupling the drive wheels to the power source in a manner that allows the operator to control propulsion and steering of the vehicle, said drive control mechanism comprising:

a pair of independently shiftable control handles configured to be gripped by the operator, each of said handles being operable to control the traction and speed of a respective one of the drive wheels; and a friction drive unit having a pair of reversible, variable speed transmissions associated with respective ones of the drive wheels for selectively coupling the drive wheels to the power source, said handles being operably coupled to respective ones of the transmissions so that the speed and direction of rotation of each of the drive wheels is controlled by shifting of a respective one of the handles.

13. In a traction vehicle as claimed in claim 12, each of said handles being shiftable in opposite directions from a rest position, with shifting in one of said directions causing forward rotation of the respective wheel and shifting in the other of said directions causing rearward rotation of the respective wheel.

said handles being coupled to the respective transmissions in such a manner that the speed of each of the drive wheels, in either direction, increases as the handle is shifted further from the rest position.

14. In a traction vehicle as claimed in claim 13, and a pair of devices for limiting shifting of respective ones of the handles in said opposite directions.

15. In a self-propelled, walk-behind traction vehicle including a power source and a pair of drive wheels, an improved operator-manipulated drive control mechanism for selectively coupling the drive wheels to the power source in a manner that allows the operator to control propulsion and steering of the vehicle said drive control mechanism comprising:

a pair of independently shiftable control handles configured to be gripped by the operator, each of said handles being operable to control the traction and speed of a respective one of the drive wheels, each of said handles including a safety switch which is configured to be depressed for signifying the presence of an operator when the handle is gripped by the operator.

16. In a traction vehicle as claimed in claim 15, said safety switch of each of the handles being operable to kill the power source when both handles are released.

17. In a self-propelled, walk-behind traction vehicle including a power source and a pair of drive wheels, an improved operator-manipulated drive control mechanism for selectively coupling the drive wheels to the power source in a manner that allows the operator to control propulsion and steering of the vehicle, said drive control mechanism comprising:

a friction drive unit having a pair of reversible, variable speed transmissions associated with respective ones of the drive wheels for selectively coupling the drive wheels to the power source, and a pair of operator controls operably coupled to respective ones of the transmissions so that the speed and direction of rotation of each of the drive wheels is controlled by a respective one of the controls.

18. In a traction vehicle as claimed in claim 17, said controls including respective shiftable handles, each of which is configured to be gripped by the operator.

19. In a traction vehicle as claimed in claim 18, each of said handles being shiftable in opposite directions from a rest position, with shifting in one of the directions causing forward rotation of the respective wheel and shifting in the other of said directions causing rearward rotation of the respective wheel.

20. In a traction vehicle as claimed in claim 19, said handles being coupled to the respective transmissions in such a manner that the speed of each of the drive wheels, in either direction, increases as the handle is shifted further from the rest position.

21. In a traction vehicle as claimed in claim 20, said handles being independently shiftable so that rotation of one of the drive wheels may be controlled independent of the other of the drive wheels.

22. In a traction vehicle as claimed in claim 21, said one of said directions and said other of said directions being the same for both handles such that the handles are shiftable in a first common direction for moving the vehicle forwardly and an opposite, second common direction for moving the vehicle rearwardly.

23. In a traction vehicle as claimed in claim 22, said handles extending in a generally fore-and-aft direction and being swingable about a common, substantially horizontal, laterally extending axis.

24. In a traction vehicle as claimed in claim 23, said first common direction being generally downward and forward.

25. In a traction vehicle as claimed in claim 24, each of said handles including a safety switch which is configured to be depressed for signifying the presence of an operator when the handle is gripped by the operator.

26. In a traction vehicle as claimed in claim 25, said safety switch of each of the handles being operable to kill the power source when both handles are released.

27. In a traction vehicle as claimed in claim 26, a pair of devices for limiting swinging of respective ones of the handles in said opposite directions.

28. In a traction vehicle as claimed in claim 27, each of said devices comprising a pair of spaced apart stationary stops and a rigid element fixed to the respective one of the handles for swinging movement therewith between the stops.

29. In a traction vehicle as claimed in claim 18, said handles extending in a generally fore-and-aft direction and being swingable about a common, substantially horizontal, laterally extending axis.

30. In a traction vehicle as claimed in claim 18, each of said handles including a safety switch which is configured to be depressed for signifying the presence of an operator when the handle is gripped by the operator.

31. In a traction vehicle as claimed in claim 30, said safety switch of each of the handles being operable to kill the power source when both handles are released.

32. In a traction vehicle as claimed in claim 18, a pair of devices for limiting swinging of respective ones of the handles in said opposite directions.

33. A self-propelled, walk-behind mower comprising:

a chassis supported by a pair of drive wheels and at least one non-driving wheel;

a power source supported on the chassis;

a mowing assembly suspended from the chassis and including a deck housing at least one rotatable cutting blade drivingly connectable to the power source; and an operator-manipulated drive control mechanism for controlling propulsion and steering of the mower, said drive control mechanism comprising— a friction drive unit including a pair of reversible, variable speed transmissions, each associated with one of the drive wheels for selectively coupling said one drive wheel to the power source, and a pair of operator controls operably coupled to respective ones of the transmissions so that the speed and direction of rotation of each of the drive wheels is controlled by a respective one of the controls.

34. A mower as claimed in claim 33, said controls including respective shiftable handles, each of which is configured to be gripped by the operator.

35. A mower as claimed in claim 34, each of said handles being shiftable in opposite directions from a rest position, with shifting in one of the directions causing forward rotation of the respective wheel and shifting in the other of said directions causing rearward rotation of the respective wheel.

36. A mower as claimed in claim 35, said handles being coupled to the respective transmissions in such a manner that the speed of each of the drive wheels, in either direction, increases as the handle is shifted further from the rest position.

37. A mower as claimed in claim 36, said handles being independently shiftable so that rotation of one of the drive wheels may be controlled independent of the other of the drive wheels.

38. A mower as claimed in claim 37, said one of said directions and said other of said directions being the same for both handles such that the handles are shiftable in a first common direction for moving the vehicle forwardly and an opposite, second common direction for moving the vehicle rearwardly.

39. A mower as claimed in claim 38, said handles extending in a generally fore-and-aft direction and being swingable about a common, substantially horizontal, laterally extending axis.

40. A mower as claimed in claim 39, said first common direction being generally downward and forward.

41. A mower as claimed in claim 40, each of said handles including a safety switch which is configured to be depressed for signifying the presence of an operator when the handle is gripped by the operator.

42. A mower as claimed in claim 41, said safety switch of each of the handles being operable to kill the power source when both handles are released.

43. A mower as claimed in claim 42, a pair of devices for limiting swinging of respective ones of the handles in said opposite directions.

44. A mower as claimed in claim 43, each of said devices comprising a pair of spaced apart stationary stops and a rigid element fixed to the respective one of the handles for swinging movement therewith between the stops.

45. A mower as claimed in claim 34, said handles extending in a generally fore-and-aft direction and being swingable about a common, substantially horizontal, laterally extending axis.

46. A mower as claimed in claim 34, each of said handles including a safety switch which is configured to be depressed for signifying the presence of an operator when the handle is gripped by the operator.

47. A mower as claimed in claim 46, said safety switch of each of the handles being operable to kill the power source when both handles are released.

48. A mower as claimed in claim 34, a pair of devices for limiting swinging of respective ones of the handles in said opposite directions.

\* \* \* \* \*